United States Patent [19]

Pepper

[11] Patent Number: 4,677,536

[45] Date of Patent: Jun. 30, 1987

[54] AC CURRENT SENSING CIRCUIT

[75] Inventor: Steven H. Pepper, Portland, Oreg.

[73] Assignee: Tektronix, Inc., Beaverton, Oreg.

[21] Appl. No.: 840,274

[22] Filed: Mar. 17, 1986

[51] Int. Cl.$^4$ ............................................. H02P 13/24
[52] U.S. Cl. .................................... 363/89; 323/266; 323/273
[58] Field of Search ............... 323/266, 273, 277, 279, 323/285; 363/89; 307/296 R, 297, 567

[56] References Cited
FOREIGN PATENT DOCUMENTS

| | | | |
|---|---|---|---|
| 593689 | 3/1960 | Canada | 307/567 |
| 27420 | 3/1981 | Japan | 323/273 |
| 57312 | 2/1984 | Japan | 323/273 |

Primary Examiner—Peter S. Wong
Assistant Examiner—Judson H. Jones
Attorney, Agent, or Firm—Mark L. Becker; George T. Noe

[57] ABSTRACT

An alternating current sensing circuit for sensing the current supplied by a power supply of an electronic instrument includes an isolation transformer and at least one transistor connected across the secondary winding of the transformer. The isolation transformer provides galvanic isolation between the power supply and internal feedback circuitry that controls the power supply located within the instrument. The transistor clamps the secondary voltage on the transformer to a constant magnitude when the base-emitter junction is forward biased. In response to the sensed current, the secondary current of the transformer flows through the transistor when the base-emitter junction is forward biased to produce the constant secondary voltage. The secondary current provides a current sensing signal which is transmitted to the feedback circuitry. The low, constant secondary voltage enables the transformer to maintain its range of frequency response and thereby accurately transform the sensed current to a secondary current that provides the current sensing signal to the feedback circuitry.

11 Claims, 6 Drawing Figures

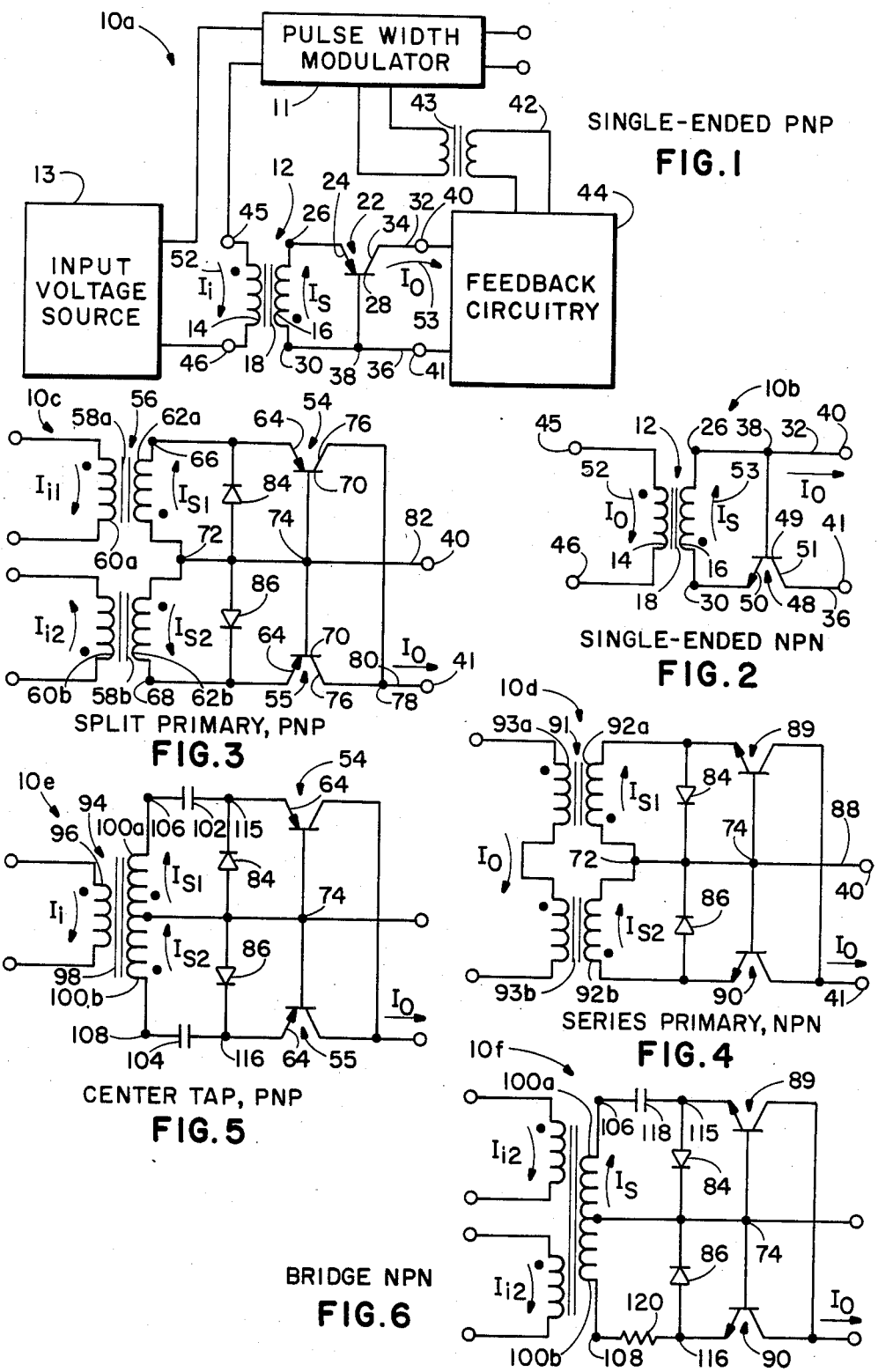

AC CURRENT SENSING CIRCUIT

BACKGROUND OF THE INVENTION

1. Field of the Invention

This invention relates to current sensing circuits for sensing alternating or pulsed current drawn from a power supply of an electronic instrument. More particularly, the invention relates to a sensing circuit that senses such current across a galvanic barrier between the power supply and the internal circuitry of the instrument.

2. Description of the Prior Art

Current sensing circuits are often found in electronic instruments to monitor the current the instrument is drawing from the power supply. The sensing circuit generates as an output a current sensing signal that is proportional to the total current drawn and transmits that signal to feedback circuitry, which adjusts the power supply accordingly to maintain a constant voltage level at the supply output.

In electronic instruments that use AC power lines as a power source, the power supply connected to the AC lines is required to be "external," or galvanically isolated from the internal instrument circuitry. This isolation ensures that an instrument operator is not exposed to electrical shock that could occur from uncontrolled power surges into the instrument through the AC lines. The current sensing circuit, too, must be galvanically isolated from the power supply so that no direct electrical connection exists across it between the external power supply and internal instrument circuitry. A well-known means for providing this isolation in a current sensing circuit is an isolation transformer with a primary-to-secondary windings ratio to produce a secondary current that is only a small fraction of the primary current in the external power supply. This secondary current is the source of the current sensing signal, be it the secondary current itself or a signal corresponding to that current. Rather than using an electrical connection, the isolation transformer uses magnetic flux linkage to transfer current across the galvanic barrier and thereby signal the feedback loop.

The accuracy of such a transformer in producing the current sensing signal is determined by the transformer's frequency response, defined as the range of frequency in which the transformer accurately transforms the primary current into the secondary current. This frequency response is a function of a number of variables, including the voltage amplitude on the secondary winding and the transformer size. Increasing the secondary voltage amplitude decreases the accuracy and narrows the frequency range by raising its low frequency boundary proportionally. On the other hand, increasing the transformer size increases the inductance and widens its frequency range by lowering the low frequency boundary.

Prior current sensing circuits have employed an isolation transformer with a resistor across the secondary windings to produce a current sensing signal. This signal, in effect the secondary voltage, increases as the secondary current increases, lowering the transformer accuracy by raising the lower frequency boundary. At primary current frequencies which fall below the low frequency boundary, the secondary current will not accurately reflect the input current and the sensing signal will contain substantial error. To compensate, prior design has enlarged the isolation transformer to increase its inductance. However, enlarging the transformer is undesirable where size and weight are critical criteria, such as on an etched circuit board.

A further drawback of prior circuits is loading of the transformer by the impedance of the internal circuitry, which affects the secondary voltage across a sense resistor.

SUMMARY OF THE INVENTION

An object of the invention, therefore, is to provide an improved current sensing circuit with increased accuracy and frequency response.

Another object of the invention is to provide a current sensing circuit that increases the frequency response and accuracy of an isolation transformer without increasing the transformer's size and weight.

Another object of the invention is to provide a current sensing circuit having a high impedance current output that is insensitive to loading of the isolation transformer.

Yet another object of the invention is to provide a current sensing circuit with a low, constant voltage amplitude across the secondary winding as the current drawn through the circuit varies.

To achieve these objects, a current sensing circuit comprises an isolating means for galvanically isolating the sensed current from the current sensing signal. The isolating means may be an isolation transformer having a primary winding and a secondary winding for coupling current across the galvanic barrier. A voltage control means is connected to the isolation transformer for maintaining the output voltage of the transformer at a predetermined low value as the current sensing signal varies. The voltage control means may include at least one transistor with its base-emitter junction connected across the secondary winding to clamp the secondary voltage on the transformer to a low, constant amplitude when the base-emitter junction is forward biased by such secondary voltage.

In one aspect of the invention, the emitter of the transistor is connected to a first terminal of the secondary winding and the base is connected to a second terminal. The secondary current flowing in one direction through the secondary winding produces an secondary voltage that is the forward-bias voltage across the base-emitter junction and therefore a constant voltage across the secondary winding. In a narrower aspect of the invention, an additional transistor may be employed within the sensing circuit to sum secondary currents of opposite polarity to produce the current sensing signal.

The foregoing and other objects, features, and advantages of the invention will become more apparent from the following detailed description of preferred embodiments which proceed with reference to the accompanying drawings.

BRIEF DESCRIPTION OF THE DRAWINGS

FIG. 1 is a schematic diagram of a first embodiment of an alternating current sensing circuit according to the invention.

FIG. 2 is a second embodiment of the current sensing circuit.

FIG. 3 is a third embodiment of the circuit.
FIG. 4 is a fourth embodiment of the circuit.
FIG. 5 is a fifth embodiment of the circuit.
FIG. 6 is a sixth embodiment of the circuit.

DETAILED DESCRIPTION

A first embodiment 10a of a current sense circuit according to the invention is shown in FIG. 1. Sense circuit 10a is connected to a pulse width modulator 11 forming part of the power supply of an electronic instrument and an input voltage source 13 for sensing current flowing therebetween and includes an isolating means for galvanically isolating current across it. The isolating means may be a single core isolation transformer 12 having a primary winding 14, a secondary winding 16, and a core 18. A voltage control means for controlling the output voltage on the isolation transformer comprises a transistor 22 connected across the secondary winding 16 with the transistor emitter 24 connected to a first end terminal 26 of the winding and the transistor base 28 connected to a second end terminal 30. An output current path 32 is connected to the transistor collector 34 for transmitting a current sense output signal produced by the circuit 10a. A return current path 36 is connected to the transistor base 28 and to the second winding terminal 30 at a common node 38. A DC voltage source (not shown) is provided in the return current path 36 to reverse-bias the base-collector junction of transistor 22 and operate the transistor in its conductive state. Paths 32 and 36 connect through the output terminals 40 and 41 of sensing circuit 10a to a feedback circuitry 44. Circuitry 44 controls the pulse width modulator 11 in the power supply of an electronic instrument such as an oscilloscope by producing a control signal on control conductor 42 that is transmitted to the modulator 11 through a second isolation transformer 43.

The input voltage source 13 to be sensed and the pulse width modulator 11 are connected at input terminals 45, 46 to the primary winding 14, with current from source 13 represented by $I_i$. The primary winding 14 may be a single turn on core 18 with a greater number of turns in the secondary winding on such core to achieve the desired current transformation ratio, i.e., the secondary current $I_s$ being 1/100 of $I_i$. The emitter or secondary current $I_s$ produced in the secondary winding 16 forward biases the base-emitter junction of transistor 22, clamping the secondary voltage $V_s$ across the secondary winding to a substantially constant voltage drop, about 0.7 volts for a standard bipolar junction transistor. For a high beta transistor 22 biased in its linear region, the collector or output current $I_o$ is nearly equal to the emitter current $I_s$, neglecting the base current, and therefore is proportional to the sensed input current $I_i$. $I_o$ is the basis for the current sensing signal.

The transistor 22 employed in circuit 10a is a PNP transistor, but the circuit works equally as well with an NPN transistor 48, as shown in the second embodiment of a current sensing circuit 10b in FIG. 2. In this and other embodiments, the same reference numerals are used to illustrate common components and only the differences between the circuits will be shown and described. The base 49 of the transistor 48 is connected to the first terminal 26 of the secondary winding, and the emitter 50 is connected to the second terminal 30. The output current path 32 therefore connects to the base 49 at the node 38 and the return current path 36 connects to the collector 51. The DC bias voltage source (not shown) is connected to reverse bias the base-collector junction of the transistor 48 through paths 32 and 36.

Circuits 10a and 10b, however, are unidirectional, transmitting $I_o$ only when $I_i$ flows in the direction indicated by arrow 52 to cause the transistors 22 or 48 to be rendered conductive and produce $I_s$ in the direction of arrow 53. If $I_i$ is an alternating or pulsed current, $I_s$ reverses direction when $I_i$ reverses its direction. This reversal produces a $V_s$ that reverse biases the base-emitter junction and switches off transistor 22 or 48.

This connection of transistor 22 across secondary winding 16 as described and illustrated above provides the transformer 12 with a low voltage buffer against larger voltages within the internal circuitry of the instrument. This voltage may be the current sense signal generated by $I_o$ flowing through a resistor within the feedback circuitry 44. The effect of a constant secondary voltage $V_s$ dropped across the base-emitter junction produces a collector current $I_o$. How $I_o$ varies in response to $I_i$ can be seen in the following equation expressing the law of induction:

$$V_s = \epsilon L 2 f_1 \tag{1}$$

where $\epsilon$ is the limit of acceptable error; L is the inductance of the secondary winding of the transformer; and $f_1$ is the lower frequency boundary on the range of the transformer's frequency response. Increasing $V_s$ across the secondary winding 16 raises $f_1$, with $\epsilon$ and L held constant. By clamping $V_s$ at a constant, low magnitude, $f_1$ remains constant and the frequency range of the transformer 12 is maintained. The voltage across the resistance within feedback circuitry 44 forming the current sensing signal may vary as the current magnitude varies, but the magnitude of the current sensing signal will not affect $V_s$ across the secondary of the tranformer 12. The accuracy of the current transformation by tranformer 12 at low current frequencies is thus not impaired.

A third embodiment of the current sensing circuit, circuit 10c, is shown in FIG. 3. Circuit 10c is a bidirectional sense circuit employing two transistors 54, 55 and a transformer 56 having a split core 58a, 58b, a pair of primary windings 60a, 60b, and a pair of series connected secondary windings 62a, 62b. The emitters 64 of transistors 54, 55 are connected to the end terminals 66, 68 of secondary windings 62a, 62b with the bases 70 of both transistors connected to an intermediate terminal 72 on a center tap between the secondary windings via a common node 74. The collectors 76 of transistors 54 and 55 are connected together at a common node 78 forming one output for both secondary currents $I_{s1}$ and $I_{s2}$. An output current path 80 through output terminal 41 to feedback circuitry 44 connects to node 78 and a return current path 82 through output terminal 40 connects to node 74. As in all these embodiments, a DC bias voltage source (not shown) to reverse bias the base-to-collector junction is provided. PN junction diodes 84, 86 are also provided to shunt energy building up in the transformer core, with the P-type end of each diode connected to node 74 and N-type end connected to the end terminals 66, 68, respectively, so that such diodes only conduct when the emitter-to-base junction in parallel therewith is reversed biased nonconducting.

Circuit 10c sums $I_{i1}$ and $I_{i2}$ applied to primary windings 60a and 60b, respectively, to produce, respectively, $I_{s1}$ $I_{s2}$ and corresponding collector currents which are added at 78 to produce an output current $I_o$, which flows from circuit 10c through path 80. $I_{s1}$ flows through the base-emitter junction of transistor 54 to produce $I_o$ when $I_{i1}$ flows in the direction shown. $I_{s2}$ flows through the base-emitter junction of transistor 55 to produce current $I_o$ when $I_{i2}$ flows in the direction shown. Diodes 84, 86 provide a current path for the magnetizing energy that builds up in the transformer core 58a, 58b when transistors 55 and 54 are switched off as the input currents $I_{i1}$, $I_{i2}$ flows in the opposite direction from that indicated for a period. When $I_{i1}$ reverses direction or decreases, for example, the stored energy in the inductance associated with core 58a is discharged as a current flowing through diode 84. Similarly, diode 86 serves as a current path to discharge energy stored in the inductance associated with core 58b.

FIG. 4 shows a fourth embodiment of the sensing circuit, circuit 10d which is similar to current 10c. Circuit 10d includes NPN transistors 89, 90 and a transformer 91 having a pair of series connected primary windings and a pair of secondary windings 92a, 92b on a split core transformer 93a, 93b. Diodes 84, 86 are reversed in direction to accommodate the NPN transistors 89, 90. Circuit 10d enables a single, alternating current primary $I_i$ to produce $I_{s1}$ and $I_{s2}$ on the secondary windings which cause transistors 89, 90 to conduct alternately in different cycle portions of the input current cycle. The collector currents of transistors 89 and 90 are summed at output terminal 41 to produce $I_o$ which flows from circuit 10d to feedback circuit 44 through path 88.

FIG. 5 shows a fifth embodiment of the current sense circuit 10e which illustrates the principles of the invention applied to a transformer 94 with a primary winding 96, a core 98, and a center tapped secondary with a pair of series connected secondary windings 100a, 100b. Circuit 10e of FIG. 5 is similar to that of FIG. 3 but also includes DC blocking and AC coupling capacitors 102, 104 that are inserted between end terminals 106, 108 of the windings 100a, 100b and the emitters 64 of transistor 54, 55, respectively. These capacitors block DC current that otherwise might saturate the core 98 and also balance the volt seconds of each voltage polarity applied across secondary windings 100a, 100b. As in the third and fourth embodiments, PN diodes 84, 86 are present, here connected between the common node 74 and the nodes 115, 116 that appear between each capacitor 102, 104 and emitters 64 of transistors 55 and 54, respectively.

FIG. 6 shows a sixth embodiment of the current sensing circuit 10f that is similar to circuit 10d of FIG. 4 but has a pair of primary windings with a single secondary winding and also includes an RC coupling formed by a capacitor 118 and a series resistor 120. This RC coupling has a time constant that aids in balancing the volt seconds of each polarity applied across secondary windings 100a, 100b. In circuit 10f, the secondary windings conduct $I_s$ in the direction shown in one portion of the current cycle through diode 84 and transistor 90 to produce $I_o$. When $I_s$ reverses direction, it flows in the other portion of the current cycle through diode 86 and transistor 89 to produce $I_o$.

Having illustrated and described the principles of the invention in preferred embodiments, it should be apparent to those skilled in the art that the invention can be modified in arrangement and detail without departing from such principles. I claim all modifications coming within the spirit and scope of the following claims.

1. An alternating current sensing circuit for generating a current sense signal in response to sensed current, the sensed current galvanically isolated from the current sense signal, comprising:
   isolating means for galvanically isolating the sensed current from the current sense signal; and
   voltage control means coupled to the isolating means for clamping the output voltage of the isolating means to a predetermined magnitude so that the magnitude remains substantially constant as the current sense signal varies.

2. The alternating current sensing circuit of claim 1 in which the isolating means comprises a transformer.

3. The alternating current sensing circuit of claim 1 in which the voltage control means comprises a transistor.

4. An alternating current sensing circuit for generating a current sense signal in response to a sensed current, the current sense signal proportional to the sensed current and a galvanically isolated therefrom, comprising:
   an isolation transformer having a primary winding and a secondary winding, the primary winding conducting the sensed current and the secondary winding generating a secondary current producing the current sense signal; and
   a transistor having an emitter, a collector, and a forward-biased base for producing a substantially constant voltage with the base-emitter junction in response to the secondary current, the emitter coupled to a first terminal of the secondary winding and the base connected to a second terminal of a secondary winding, the secondary current flowing through the base-emitter junction of the transistor to produce the constant secondary voltage as the secondary current and thereby the current sense signal varies.

5. The circuit of claim 4 including two transistors, the emitter of a first transistor coupled to a first end of the secondary winding and the emitter of a second transistor coupled to a second end of the secondary winding.

6. The circuit of claim 4 in which the secondary winding of the transformer includes a third terminal and the circuit includes two transistors, the emitter of a first transistor coupled to the first end of the secondary winding, the emitter of a second transistor coupled to the second end of the secondary winding, and the bases of the transistors coupled to the third terminal of the secondary winding, the two transistors enabling the circuit to sum sensed currents to produce the current sensing signal.

7. The circuit of claim 5 including a diode coupled between the emitter and base of each transistor to provide a discharge path for magnetizing energy stored in the transformer.

8. The circuit of claim 5 in which the transformer comprises a split primary core and the transistors comprise PNP transistors.

9. The circuit of claim 5 in which the transformer comprises a series primary winding and the transistors comprise NPN transistors.

10. The circuit of claim 5 including a capacitor coupled between each emitter and a terminal of the secondary winding to block direct current to the transformer by balancing the volts second of each polarity applied across the secondary winding.

11. The circuit of claim 5 including a capacitor and resistor cooperating to balance the volts second of each polarity applied across the secondary winding.

* * * * *